United States Patent [19]

Schwenninger

[11] Patent Number: 4,824,462
[45] Date of Patent: Apr. 25, 1989

[54] FLOW CONTROL MEANS FOR MOLTEN GLASS OR THE LIKE

[75] Inventor: Ronald L. Schwenninger, Ridgeley, W. Va.

[73] Assignee: PPG Industries, Inc., Pittsburgh, Pa.

[21] Appl. No.: 132,236

[22] Filed: Dec. 14, 1987

[51] Int. Cl.⁴ .............................................. C03B 17/04
[52] U.S. Cl. ...................................... 65/325; 65/225; 65/326; 65/356; 65/374.12
[58] Field of Search ............ 65/325, 326, 330, 378.12, 65/129, 355, 356, 122, 126, 183, 225

[56] References Cited

U.S. PATENT DOCUMENTS

| | | | |
|---|---|---|---|
| 1,643,601 | 9/1927 | Beebe | 65/330 X |
| 1,692,306 | 11/1928 | Kingsley | 65/326 X |
| 1,766,638 | 6/1930 | Howard | 65/326 X |
| 1,888,963 | 11/1932 | Peiler | 65/332 X |
| 1,928,598 | 9/1933 | Morton et al. | |
| 2,100,760 | 11/1937 | Wadsworth | |
| 2,754,346 | 7/1956 | Williams | |
| 3,334,981 | 8/1967 | Glaser | 65/12 X |
| 3,537,277 | 11/1970 | Eden | 65/330 X |
| 3,580,714 | 5/1971 | Lucek | 65/330 |
| 3,656,924 | 4/1972 | Chapman et al. | 65/330 X |
| 3,754,886 | 8/1973 | Richards et al. | 65/134 |
| 4,381,934 | 5/1983 | Kunkle et al. | 65/135 |
| 4,402,718 | 9/1983 | Bhatti | 65/374.12 X |
| 4,600,426 | 7/1986 | Schwenninger | 65/330 |

*Primary Examiner*—Robert L. Lindsay
*Attorney, Agent, or Firm*—Dennis G. Millman

[57] ABSTRACT

Improvements in devices for metering the flow of molten material such as glass include a catenary support structure, internal passageways in the bulbous valve body for directing molten material to the downstream side of the support arm or arms, and electrical isolation of the valve components from each other to recude electrolytic corrosion. An advantage of the invention is that use of precious metals such as platinum is avoided.

16 Claims, 2 Drawing Sheets

FLOW CONTROL MEANS FOR MOLTEN GLASS OR THE LIKE

BACKGROUND OF THE INVENTION

This invention relates to controlling the flow of molten material such as glass from a vessel. It is particularly applicable to an outlet from the bottom of a vertically elongated vessel.

Various means are known in the art for controlling the flow of molten material such as glass through a gravity fed drain. Many of these arrangements involve manipulating the viscosity of the material by variably heating or cooling the drain tube. An induction coil associated with a drain tube is a typical example. In some cases these approaches may be employed satisfactorily, but they posses certain drawbacks in the large scale melting of glass. The quantity of heat in a rapidly flowing stream of glass (e.g., on the order of hundreds or thousands of kilograms per hour) is so great that it is difficult to significantly influence the viscosity of the stream by heat transfer through walls of a drain tube. On the other hand, when adequate heat exchange is provided to effect control of the flow rate, the sensitivity of glass viscosity to temperature makes it difficult to finely modulate the flow rate. physical flow restricting means ("plungers") are well known in the art for controlling molten glass flow. A typical plunger arrangement involves structural elements within the melting vessel that interact with the upper end of a drain orifice. Such an arrangement would present problems in a vessel having a large height of molten glass in that rigidity of the plunger shaft would be difficult to maintain without excessive cooling.

In U.S. Pat. No. 4,600,426 (Schwenninger) there is provided an arrangement for metering the flow of molten material from the bottom of a deep vessel by mechanical throttle means engaging the exterior of an outlet tube. A bulbous member supported by a laterally extending arm constitutes the throttle means. The support arm has downwardly converging surfaces in order to promote a coherent flow of the molten material. That arrangement is capable of satisfactory performance, particularly when the throttle member is fabricated of or coated with platinum or alloys thereof. It is desirable, however, to use less costly materials such as molybdenum, which has excellent durability in contact with molten glass, but oxidizes rapidly when exposed to an oxygen-containing atmosphere at elevated temperatures. Therefore, the bulbous portion of the throttle member can be made of molybdenum since it is enveloped by molten glass, but the support arm cannot due to its exposure to the atmosphere. If the arm is preserved by cooling, it has been found that the molten glass stream does not wet the cooled element, and a long, open furrow is created in the stream below the support arm. As a result, a path is opened for attack of atmospheric oxygen on the molybdenum bulbous portion. Prior to the present invention, this dilemma has thwarted attempts to use less costly materials in devices of this type.

SUMMARY OF THE INVENTION

In the present invention an arrangement is provided for metering the flow of molten glass wherein there may be used less costly materials that may not be able to withstand high temperature exposure to the atmosphere. The metering means comprise a bulbous member that may be fabricated of a material that is subject to oxidation, such as molybdenum, and a support arm that may be cooled by circulation of a cooling fluid such as water. To avoid opening a furrow below the unwetted support arm, a passage is provided in the bulbous member for molten glass to pass from an upstream surface of the bulbous member, through the bulbous member, and out of the bulbous member at a location directly under the junction of the support arm with the bulbous member. Molten glass flowing through the passage fills the void under the support arm and protects the bulbous member from contact with the atmosphere. If the support arrangement involves more than one junction with the bulbous member, a plurality of passages may be provided.

In order to minimize the degree to which the molten glass stream is parted by the support means, it is another object of the present invention to minimize the dimensions of the support structure that is in contact with the glass. To this end, the bending strength requirements of the support arm may be reduced, and thus the dimensions reduced, by avoiding structural arrangements that produce bending moments. A support arrangement that is free of bending moment is a catenary support, whereby the forces in an elongated member freely hanging between two points of attachment are almost entirely tension forces. By substantially eliminating bending forces and capitalizing on the relatively great strength of metal against tension forces, a catenary sling support arrangement for the bulbous member may comprise a relatively slender, downwardly arcuate tube from which the bulbous member is hung. In a preferred embodiment, the tube passes through the bulbous member, and coolant is passed through the tube. Because the tube is cooled, it need not be fabricated of refractory metal, but may be stainless steel or the like, further reducing the cost of the glass metering device.

To avoid electrolytic corrosion of the metering device, preferred embodiments include means to electrically insulate upper and lower portions of the metering device from each other. This optional feature is particularly significant in embodiments that include an elongated structure such as a flow guide member extending below the bulbous metering member.

THE DRAWINGS

DETAILED DESCRIPTION

Figure 1:
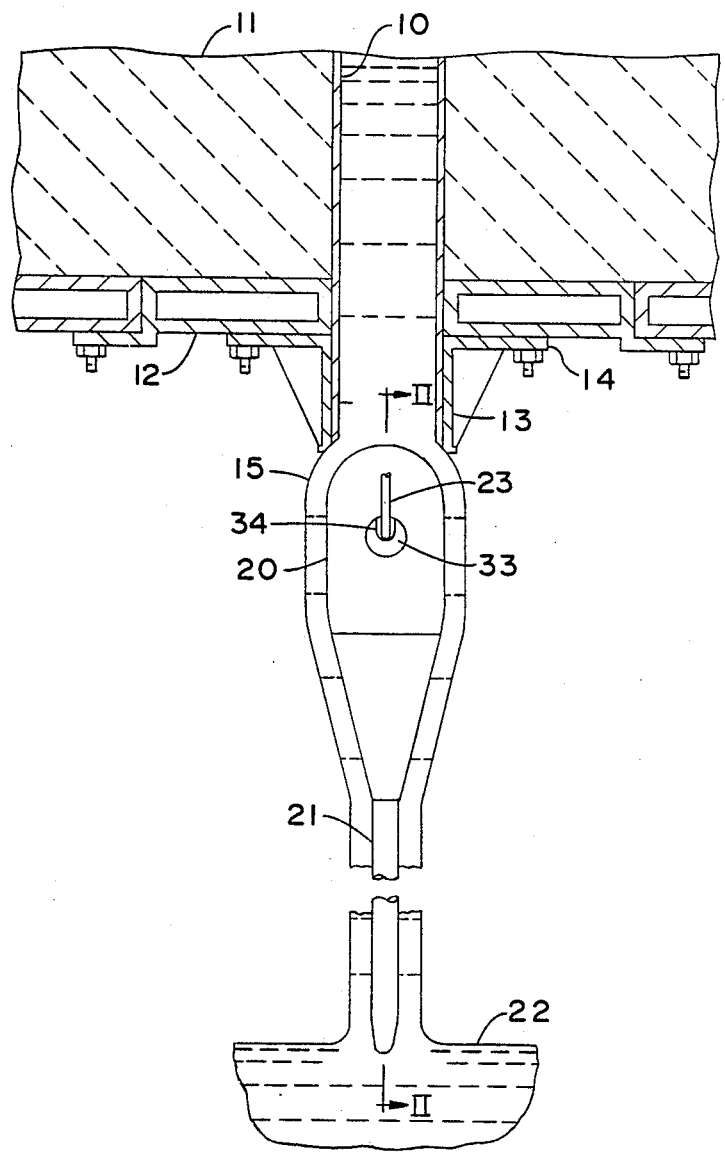
FIG. 1 is a side elevational view of a glass flow regulating device in accordance with a preferred embodiment of the present invention.

The principles of the present invention are applicable to handling a wide variety of molten materials, but the detailed description herein will relate primarily to an embodiment specifically designed for processing molten glass for which the invention is particularly advantageous. The environment of the flow control device may be at any point in the process where the molten material is being transferred vertically from one stage to another. The location illustrated in FIG. 1 as an example is at an outlet drain at the bottom of a glass refining vessel such as that disclosed in U.S. Pat. No. 4,600,426 (Schwenninger) or U.S. Pat. No. 4,738,938 by G. E. Kunkle, W. M. Welton and R. L. Schwenninger. The drain with which the flow metering device of the present invention interacts will generally comprise a cylindrical tube, but the particular structure of the orifice is not critical to the present invention. In the example shown in FIG. 1, the drain comprises a tube 10 extending through a ceramic refractory bottom 11 of a refining vessel. The tube 10 may be made of a refractory metal such as a platinum-rhodium alloy. In this embodiment an annular cooler 12 is mounted around the lower end of the opening in the bottom through which the tube 10 extends so as to prevent leakage of molten glass. Optionally, a reinforcing ring 13 may be affixed to the lower end of the tube 11 from which a flange 14 may extend to permit attachment to the adjacent vessel structure or other suitable support. Molten material 15, such as molten glass, flows downwardly through the tube 10.

In accordance with the present invention, controlling the flow of molten glass through the tube 10 involves flow obstruction means outside the vessel interacting with the lower end of the tube. A particularly advantageous arrangement is that shown in the drawing whereby a streamlined inverted "teardrop" shaped element 20 is supported slightly spaced below the tube 10 so as to form an annular passageway therebetween through which a stream of molten glass flows. The element 20 is enveloped by the molten stream. By varying the vertical position of the element 20 the size of the annular passageway may be varied, and thus the volume of flow may be controlled. Another feature shown in the drawings that is desirable but not essential to some aspects of the present invention is the elongated tailpiece 21 extending from the lower end of the bulbous portion of the flow control element 20 downwardly to the vicinity of the surface of a body of liquid 22 into which the molten stream is flowing. The tailpiece 21 serves as a flow guide to prevent coiling or folding of the stream as it enters the liquid body 22. If the distance between the bottom end of the tube 10 and the surface of the liquid body 22 is small, the tailpiece 21 may not be needed.

Figure 2:
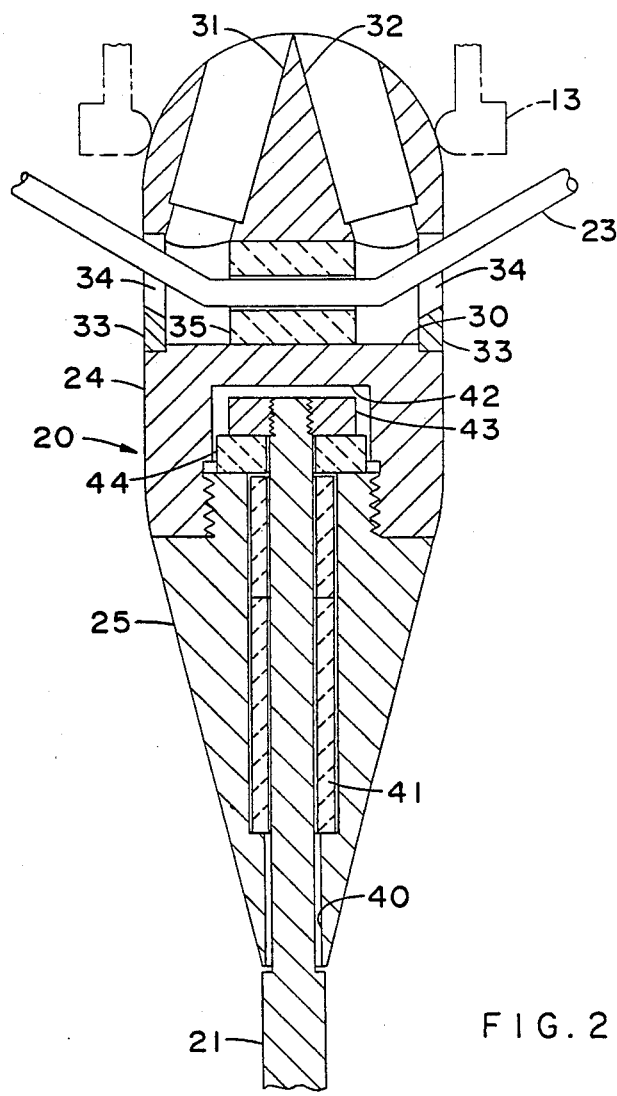
FIG. 2 is a cross-sectional view of the regulating device of FIG. 1 taken along line II—II.
Figure 2:

The flow control element 20 is supported by a catenary arrangement in accordance with the preferred embodiment depicted in FIGS. 1 and 2. The catenary support means in this embodiment comprises an elongated catenary arm 23 passing through the bulbous portion of the flow control element 20 and attached at both ends to rigid support means (not shown) provided with vertical adjustability and preferably horizontal adjustability as well. Any suitable support structure could be employed to carry the ends of the catenary arm 23, such as a steel "U" shaped yoke extending horizontally. Ideally, a catenary is flexible and freely handing, but catenary arm 23 need not have these features. The attribute of an ideal catenary that is present in the present invention is that the catenary arm 23 is oriented so that the weight it carries results almost exclusively in tension forces within the catenary member 23, that is, the forces are primarily along its length as opposed to bending forces. Therefore, the catenary arm 23 can be chosen to be rather slender since resistance to bending is not a consideration. Slenderness is advantageous in that the stream of molten material will be disturbed less as it flows around the catenary support arm. Metal lends itself as the preferred material for the catenary arm because of its relatively great strength in tension at small diameters, but the location of the catenary arm 23 in the present invention presents some difficulties. Steel is strong in tension, but could not withstand contact with molten glass. Platinum would be durable in contact with the glass and air, but its strength in tension at the elevated temperatures involved is not adequate. Furthermore, an object of this invention is to reduce the use of costly materials such as platinum. Molybdenum is unsuitable for the catenary because portions of the catenary are in contact with air, which in the high temperature environment would result in oxidation of the molybdenum. This problem may be overcome by employing metal tubing (preferably stainless steel) as the catenary member, with passage of coolant (preferably water) through the tubing. Although the tubing is hollow, the cooling maintains its strength sufficiently that a small diameter of tubing may be employed. Tubing with an outside diameter of 0.25 inch (6 millimeters) has been found to be sufficient. The tubular catenary 23 has some rigidity and therefore will not hang freely in the parabolic shape of an ideal catenary. The tube could be bent to a parabolic shape, but for ease of fabrication merely an approximation of a downward curve may suffice. As shown in FIG. 2, the catenary arm 23 may actually be shaped as a series of straight line segments. Although the use of a material that is not completely flexible and a shape that is not strictly parabolic will inherently result in some bending forces being present in the catenary arm, these forces are minor, and the major portion of the load is carried in tension by the catenary arm as in an ideal catenary.

Referring to FIG. 2, the flow control member 20 may comprise a generally spherical upper body portion 24 and a generally conical lower body portion 25. Separate body portions are required for the optional feature of electrically insulating the tailpiece as will be described more fully hereinbelow, but if that feature is not employed, the flow control member 20 may be fabricated as a single piece. Both upper and lower body portions 24 and 25, as well as the tailpiece 21, are preferably molybdenum. As shown in FIG. 2, the upper body portion may be somewhat elongated vertically so as to accommodate the mounting provisions for the catenary 23 and the tailpiece 21, thereby creating a cylindrical section between the spherical top and the conical lower body portion 25. A bore 30 extends horizontally through the upper body portion 24 for receiving the catenary arm 23. The bore 30 need be only large enough to accommodate the catenary arm 23, but the preferred arrangement shown in FIG. 2 has a substantially larger bore so as to provide a flow path for molten glass through the interior of the flow control member 20. For this purpose, two additional bores 31 and 32 extend in a generally vertical direction from the upper spherical surface of the upper body portion 24 to the horizontal bore 30 so as to provide passageways for molten material to flow into the bore 30 and to escape from the bore 30 in the regions immediately below the catenary arm 23. The streams of glass flowing from the bore 30 serve to fill any furrow in the main flow stream caused by the presence of the catenary arm 23, and as a result, the surface of the flow control member 20 below catenary arm 23 is covered with molten material and is thereby protected from oxidation. Inserts 33 may be affixed at the ends of bore 33 to restrict the size of the openings and to direct the flow to the upper portion of the bore 30 so that the stream leaving the bore fills the spaces directly under the catenary arm 23 to avoid entraining air bubbles in the main flow stream. The inserts 33 may each have an opening 34 in the upper portion of the insert in the area close to the catenary arm 23. The openings 34 may have a generally "U" shaped configuration as can be seen in FIG. 1. The catenary arm 23 passes through a bushing 35 in the center of the bore 30. The bushing divides the flow through the internal bores into two separate paths, and the bushing 35 may be made of an electrically insulating ceramic material (such as fused quartz) if it is desired to electrically isolate the flow control member 20 from the catenary arm 23 so as to prevent electrolytic corrosion effects.

In simple embodiments of the invention, the tailpiece 21 may be threaded or welded into a socket at the bottom end of the lower body portion 25. The more complex attachment arrangement for the tailpiece shown in FIG. 2 is designed to implement the optional aspect of the invention of avoiding corrosive electrolytic effects. Thus, the tailpiece in FIG. 2 is provided with an internal attachment arrangement so as to permit it to be electrically insulated from the remainder of the flow control device. The tailpiece 21 extends upwardly through a bore 40 in spaced relationship to the surrounding lower body portion 25. The spaced relationship may be maintained by a ceramic sleeve 41 which may be made of fused quartz. The upper end of the tailpiece may be retained within a cavity 42 within the upper body portion 24 by being threaded into a molybdenum collar 43 resting on a ceramic washer 44 which may also be made of fused quartz.

The detailed description herein has related to a specific embodiment for the sake of disclosing the preferred mode of the invention, but it should be understood that variations and modifications that are known to those skilled in the art may be resorted to without departing from the scope of the invention as defined by the claims that follow.

I claim:

1. Apparatus for controlling flow of molten glass or the like comprising:
a vessel adapted to contain a melt of glass or the like;
an orifice for passing a stream of the melt vertically from the vessel;
flow control means mounted in alignment with and below the exterior end of the orifice at variable proximity thereto so as to vary the opening from the orifice, including a bulbous member facing the orifice, a support arm extending transversely from the bulbous member, and a passageway extending through the bulbous member from the top of the bulbous member to a side portion under the support such that some of the melt flows through the passageway to fill a void in the flow stream under the support, thereby avoiding entrainment of gases in the stream.

2. The apparatus of claim 1 wherein the bulbous member is made of molybdenum.

3. The apparatus of claim 1 wherein the support arm includes a passage for circulation of cooling fluid.

4. The apparatus of claim 3 wherein the support arm extends from two opposite sides of the bulbous member.

5. The apparatus of claim 4 wherein the support arm passes through the bulbous member.

6. The apparatus of claim 5 wherein the support arm is generally downwardly arcuate so as to serve substantially as a catenary support.

7. The apparatus of claim 6 wherein the support arm comprises a slender metallic tube.

8. The apparatus of claim 7 wherein the metallic tube is steel.

9. The apparatus of claim 5 wherein the support arm is electrically insulated from the bulbous member.

10. The apparatus of claim 4 wherein two passageways are provided through the bulbous member extending from the top to the two respective side regions intersected by the support arm.

11. Apparatus for controlling flow of molten glass or the like comprising:
a vessel adapted to contain a melt of glass or the like;
an orifice for passing a stream of the melt vertically from the vessel;
a bulbous flow control element aligned below the orifice; ands
support means comprising a slender, elongated element adapted for passage of cooling fluid therethrough extending through the bulbous member and supported at opposite ends and having a generally downwardly arcuate configuration so as to serve substantially as a catenary support.

12. The apparatus of claim 11 wherein the slender, elongated support element is comprised of a metallic tube.

13. The apparatus of claim 12 wherein the metallic tube is steel.

14. The apparatus of claim 11 wherein the bulbous member is made of molybdenum.

15. Apparatus for controlling flow of molten glass or the like comprising:
a vessel adapted to contain a melt of glass or the like,
an orifice for passing a stream of the melt from the vessel;
a bulbous flow control element aligned with the orifice;
a support arm engaging the bulbous element; and
insulating means between the bulbous element and the support arm so as to provide electrical isolation therebetween to avoid electrolyte corrosion that may introduce detects into the steam.

16. The apparatus of claim 15 further including an elongated tailpiece extending from the bulbous element, with the tailpiece electrically isolated from the bulbous element.

* * * * *

UNITED STATES PATENT AND TRADEMARK OFFICE
CERTIFICATE OF CORRECTION

PATENT NO. : 4,824,462
DATED : April 25, 1989
INVENTOR(S) : Ronald L. Schwenninger It is certified that error appears in the above-identified patent and that said Letters Patent is hereby corrected as shown below:

Claim 11, line 7, "ands" should be --and--.

Claim 15, line 11, "electrolyte" should be --electrolytic--.

Claim 15, line 12, "detects" should be --defects--.

Signed and Sealed this

Twelfth Day of June, 1990

Attest:

HARRY F. MANBECK, JR.

*Attesting Officer*  *Commissioner of Patents and Trademarks*